United States Patent [19]

Spencer

[11] Patent Number: 5,518,214

[45] Date of Patent: May 21, 1996

[54] FASTENING MEANS FOR LIGHTING

[76] Inventor: Michael A. Spencer, 107 Cadillac Rd., St. Mary's, Pa. 15857

[21] Appl. No.: 275,630

[22] Filed: Jul. 15, 1994

[51] Int. Cl.$^6$ ..................................................... A44B 1/18
[52] U.S. Cl. .......................... 248/205.2; 248/65; 362/249
[58] Field of Search .................... 248/205.2, 50, 248/74.3, 74.1, 65, 73; 362/145, 249

[56] References Cited

U.S. PATENT DOCUMENTS

| | | | |
|---|---|---|---|
| 2,850,560 | 9/1958 | Heyob | 248/50 X |
| 3,275,818 | 9/1966 | Campbell | |
| 3,370,818 | 2/1968 | Perr | |
| 3,415,300 | 10/1968 | Worcester | 248/205.2 X |
| 3,540,687 | 11/1970 | Cuva | |
| 4,244,014 | 1/1981 | Vaness | 362/249 |
| 4,417,710 | 11/1983 | Adair | 248/205.2 X |
| 4,714,219 | 12/1987 | Mayse | |
| 4,852,832 | 8/1989 | Delaney | |
| 4,901,212 | 2/1990 | Prickett | |
| 4,901,960 | 2/1990 | Gary | |
| 4,930,740 | 6/1990 | Vogt | 24/17 AP X |
| 4,962,907 | 10/1990 | Gary | 362/249 X |
| 4,974,128 | 11/1990 | Prickett | |
| 4,988,338 | 1/1991 | Taylor | 248/74.3 X |
| 5,067,061 | 11/1991 | Prickett | |
| 5,238,425 | 8/1993 | Kliewer | |
| 5,295,055 | 3/1994 | Brock et al. | |

*Primary Examiner*—J. Franklin Foss
*Attorney, Agent, or Firm*—Michael J. Kline; Noland J. Cheung

[57] ABSTRACT

A device and method for fastening lighting to a supporting structure. The first fastening element, an anchor portion, includes an adhesive backing to attach to the supporting structure. A second fastening element, a fastening portion, is secured to the anchor portion by a plurality of VELCRO® loops and hooks, which may also attached to a third fastening element, a disk portion, by an adhesive means. The fastening portion includes a pair of holes for receiving a fastener for securing wire.

4 Claims, 3 Drawing Sheets

FASTENING MEANS FOR LIGHTING

FIELD OF THE INVENTION

The present invention relates to a fastening means for lighting. More specifically, the fastening means of the present invention, preferably comprising VELCRO® hooks and loops, is adapted to receive a string of decorative lights, such as those typically used at Christmas or other festive occasions. The use of such a fastening means eliminates the standard practice of stapling the wires of the string of decorative lights to walls, eaves, soffit, facia, or window frames, which can cause electrical short circuits and constitute a fire hazard. In addition, the wiring can be easily removed from the supporting structure, thereby eliminating a major inconvenience in removal of the wire.

DISCUSSION OF THE PRIOR ART

A common method for fastening lighting to a supporting structure is to provide individual socket supporting members which may be screwed, nailed, clamped or otherwise secured in a predetermined, mutually spaced orientation around the particular building's edge. Once these individual support elements are fastened into place, the bulb and socket portions of one or more light strings are suitably secured to the support structure. One such light holder is disclosed in Prickett (U.S. Pat. No. 4,901,212).

Generally, support elements may be screwed, nailed or clamped to the support structure. Unfortunately, many problems exist with such installations. For example, such installations may be cumbersome to install and also detract from the appearance of the structure. Furthermore, such installations also tend to remain a permanent fixture on the structure. Thus, such problems have been solved by applying adhesives to the back of the support elements to attach to a support structure. One such support element is disclosed in Prickett (U.S. Pat. No. 5,067,061).

Another problem with prior art light fastening means is the difficulty in separating the wire from the structure. Generally, such removal may require much time and may even result in damage to the wire.

The use of VELCRO® fasteners, manufactured by Velcro USA Inc., 406 Brown Avenue, Manchester, N.H. 03108, for fastening objects is disclosed in Perr (U.S. Pat. No. 3,370,818). Perr discloses a fastening means comprising two opposing surfaces. An adhesive can be applied to the back surfaces of the VELCRO® to enable the fastening means to be secured to various surfaces. Pert, however, does not disclose or suggest a fastening means for wire.

SUMMARY OF THE INVENTION

A preferred embodiment of the present invention relates to a method and device for fastening wiring and/or lighting to a supporting structure. This invention includes a fastening device with an anchoring portion and a fastening portion. The anchoring portion is two-sided. The first side contains an adhesive to enable the anchoring portion to be attached to the supporting structure. The opposite side comprises a plurality of VELCRO® loop stitches or hooks.

The fastening portion also includes two sides. The first side comprises a plurality of VELCRO® hooked or loop portions to enable the anchoring portion to interlock with the fastening portion. The fastening portion also includes a pair of holes to receive a fastener to secure the wiring and/or lighting to the fastening portion.

In an alternative embodiment, the fastening device comprises an anchor portion, fastening portion, and a disk portion. In this embodiment, the disk portion, not the fastening portion, includes two holes to receive a fastener. The disk portion is then attached to the adhesive backing of the fastening portion which in turn is attached to the anchor portion.

Thus, it is an object of the present invention to enable the user to conveniently fasten wire to a supporting structure.

It is still another object of the present invention to provide a fastening device which can be easily removed.

It is yet another object of the present invention to reduce the number of manufacturing steps, and therefore, reduce the manufacturing cost of the fastening device while at the same time producing a better product. This object is accomplished by the fastening device of the present invention which comprises fewer and less complicated components.

BRIEF DESCRIPTION OF THE DRAWINGS

In the accompanying drawings, the preferred embodiments of the invention and preferred methods of practicing the invention are illustrated in which.

DETAILED DESCRIPTION OF THE PREFERRED EMBODIMENTS

Figure 1:
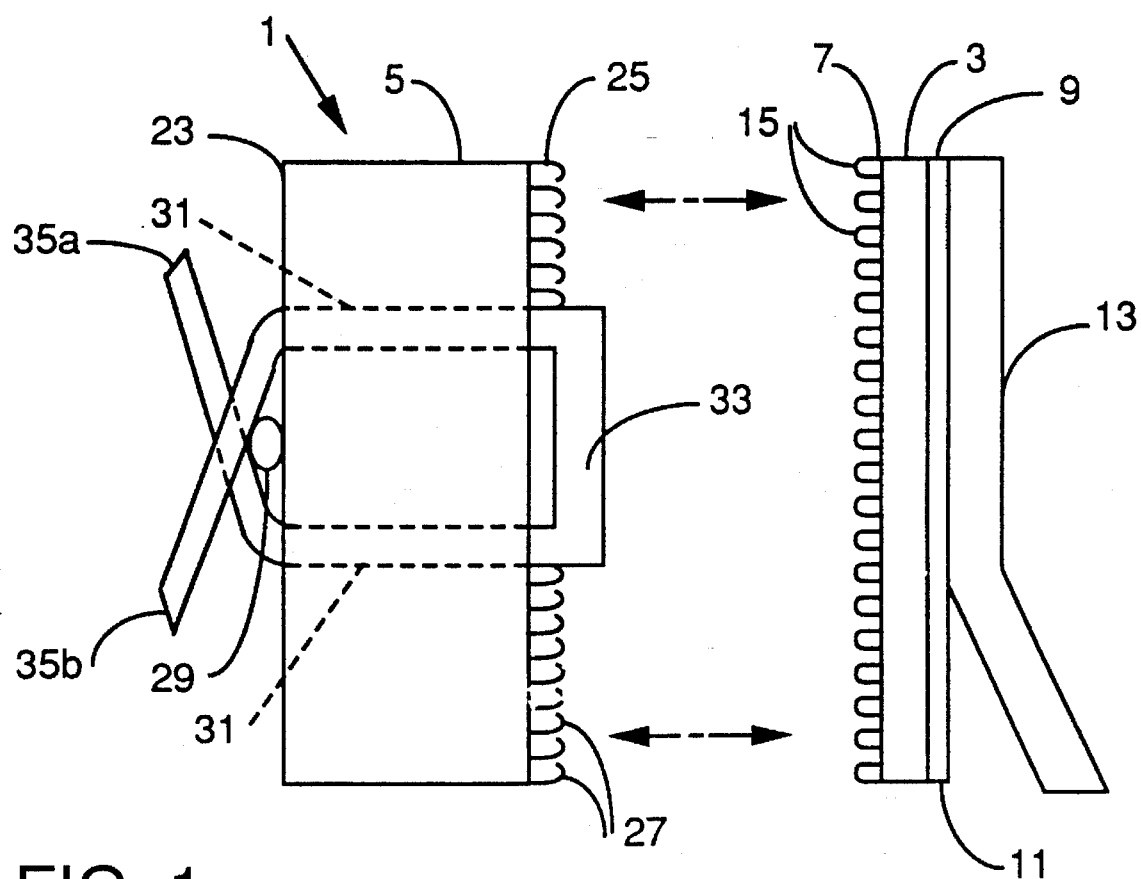
FIG. 1 is an elevation view of a fastening device constructed in accordance with the present invention.

An embodiment of the device of the present invention for fastening wire 1 is shown in FIG. 1. The device for fastening wire has an anchor portion 3 and a fastening portion 5.

The anchor portion 3 comprises a first side 7 and second side 9. The second side 9 comprises an adhesive backing 11 having a removable cover strip 13 mounted on the adhesive backing 11. The removable cover strip 13 is removed, whereby the exposed adhesive backing 11 is then attached to the supporting structure, thereby securing the anchor portion 3 to the structure.

The first side 7 of the anchor portion 3 comprises a fastening surface, for releasably securing wire 29 to a structure; the fastening surface preferably comprising a plurality of either VELCRO® loops or hooks 15. Alternate fastening surfaces may include adhesives, snaps, hooks, magnets, or other fasteners.

The fastening portion 5 also comprises a first side 23 and second side 25. The second side 25 of the fastening portion 5 comprises a plurality of either VELCRO® hooks or loops 27. Preferably, the first side 7 of the anchor portion 3 comprises a plurality of loops 15 and the second side 25 of the fastening portion 5 comprises of a plurality of hooks 27 to enable the anchor portion 3 to be releasably secured to the fastening portion 5.

The fastening portion 5 also includes a means for securing the wire 29 to the fastening portion 5. As shown in FIG. 1, the fastening portion 5 may include a pair of holes 31 to receive a fastener 33. Each end of the fastener 35a, 35b is inserted through the second side 25 of the fastening portion 5 and out the first side 23, of the fastening portion 5. The wire 29 is then fastened to the fastening portion 5 by the fastener 33. The fastener 33 may be a plastic tie, wire tie, hook, rope, string, or other types of fasteners, and may be integrally formed with the fastening portion 5.

Figure 1A:
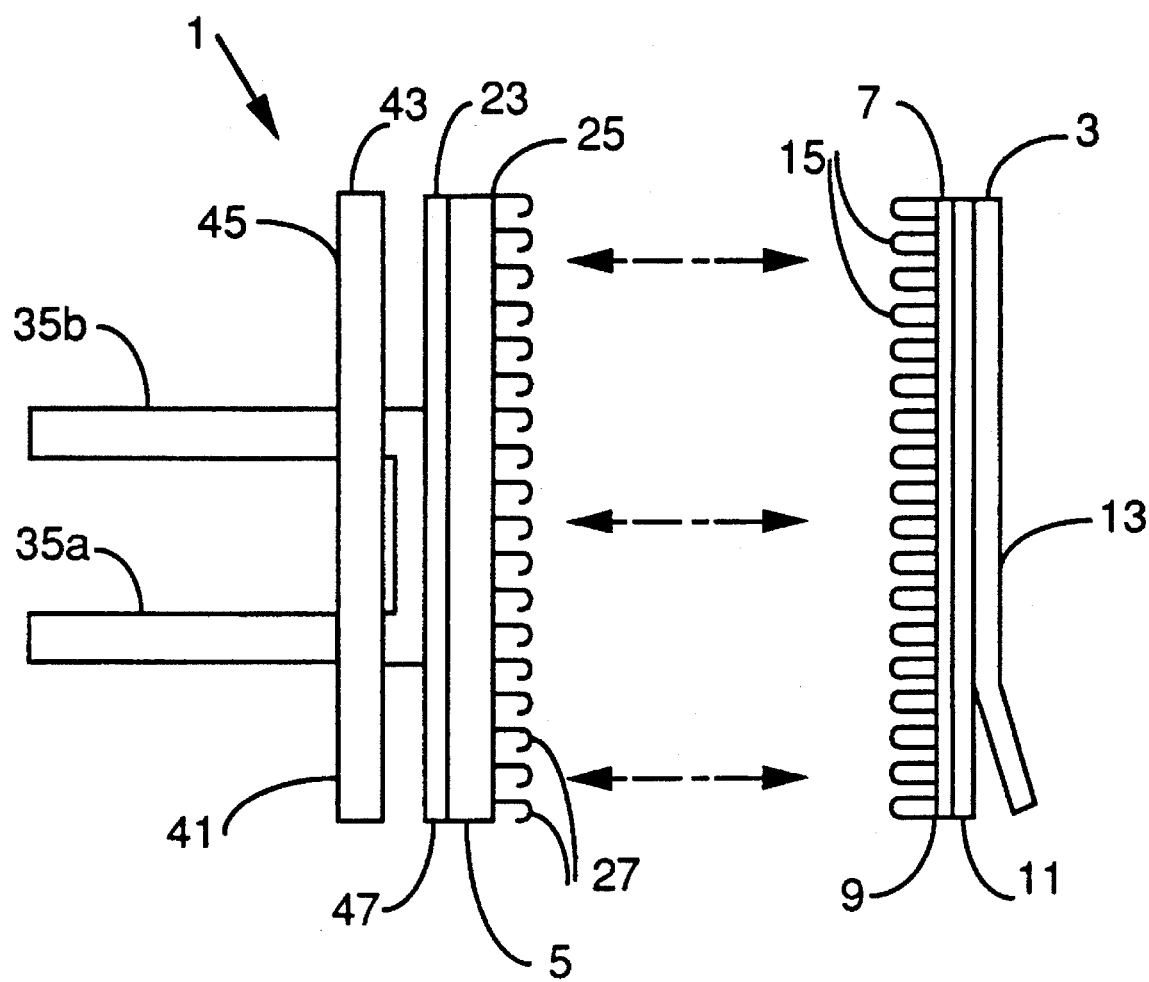
FIG. 1a is an elevation view of the fastening device illustrating another embodiment of the invention.

Another preferred embodiment of the device for fastening wire 1 of the present invention is shown in FIG. 1a. This embodiment differs from the embodiment of FIG. 1 by including a disk portion 41.

Figure 2:
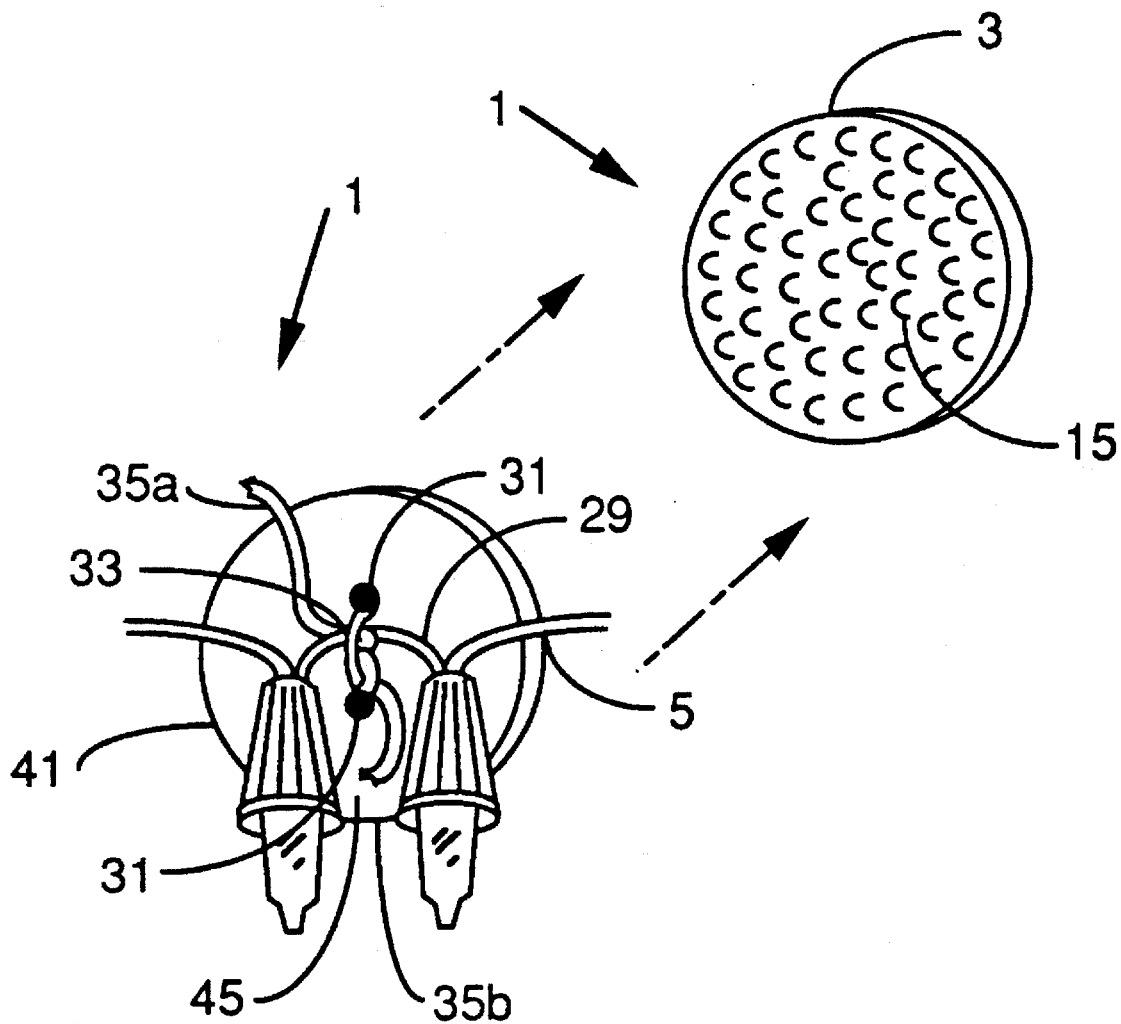
FIG. 2 is a perspective view of the fastening device with lighting fastened by a wire fastener.

The disk portion 41 comprises a first side 43 and second side 45. The first side 43 of the disk portion 41 is secured to an adhesive strip 47 of the first side 23 of the fastening portion 5. Preferably, the shapes and sizes of the anchor portion 3, fastening portion 5, and the disk portion 41, are all the same and are circular, about three quarter inch (¾") in diameter and about 2.0 mm in thickness. As illustrated in FIG. 2, a pair of holes 31 are preferably located equidistant from the center of the disk portion 41. Prior to attaching the disk portion 41 to the fastening portion 5, the ends 35a, 35b of the fastener 33 are inserted through the first side 43 of the disk portion 41 and outward from the second side 45 of the disk portion 41. The first side 43 of the disk portion 41 is then attached to the fastening portion 5.

The anchor portion 3 and fastening portion 5 are preferably constructed of a durable material suitable for outdoor use including fabrics, metals, synthetic materials, and are preferably, but not necessarily, pliable. For example, they may be made of fabric, such as, but not limited to, felt. The disk portion 41 is also preferably constructed of a material suitable for outdoor use including fabrics, metals, synthetic materials or most preferably, plastics. Finally, the fastener 33 may be any plastic tie, metal wire, hook, rope, string or any other object that may be used to fasten wire.

The present invention also teaches a method for fastening wire to a supporting structure using the previously described device 1. The anchor portion 3 is secured to a supporting structure by removing the adhesive backing 13, thereby exposing the adhesive layer 11, which then allows the anchor portion 3 to be adhered to the supporting structure, the surface of which is preferably clean and dry. A fastener 33 is inserted through the holes 31 included in the fastening portion 5 and the wire 29 is placed between the fastener 32 such that the wire 29 is secured to the fastening portion 5 when each end 35a, 35b of the fastener 33 is twisted together in either a clockwise or counter-clockwise direction, when the fastener comprises a wire twister. The fastening portion 5 is then releasably secured to the anchor portion 3 on the supporting structure by engaging the velcro loops and hooks 15, 27 on the opposing surfaces 7, 25 of the anchor portion 3 and fastening portion 5.

In an alternative embodiment of the present method, the disk portion 41 and the fastening portion 5 include holes 31 for receiving a fastener 33. A fastener 33 is inserted first through the holes 31 included in the fastening portion 5 and out the second side 45 of the disk portion 41. The wire 29 is then placed between each end 35a, 35b of the fastening portion 5. When each end 35a, 35b of the fastener 33 is twisted together in either a clockwise or counter-clockwise direction, the wire 29 is secured to the disk portion 41. The disk portion 41 is then attached to the fastening portion 5 by an adhesive backing 47 on the first side 23 of the fastening portion 5. The fastening portion 5 is then releasably secured to the anchor portion 41 on the supporting structure by engaging the velcro loops and hooks 15, 27 on the opposing surfaces of the anchor portion 3 and fastening portion 5.

Although the invention has been described in detail in the foregoing for purposes of illustration, it is to be understood that such detail is solely for that purpose and that variations can be made therein by those of ordinary skill in the art, without departing from the spirit and scope of the invention as defined by the claims. Such variations are specifically intended to be embraced by the scope of the following claims and by all equivalents thereof.

I claim:

1. A device for releasably fastening an object to a support structure comprising:

a) anchor means for anchoring said device to said support structure, said anchor means including means for releasably securing an object fastening means thereto; and b) said object fastening means including means for securing said object thereto, and complementary means for releasably securing said object fastening means to said releasable securing means of said anchor means (c) wherein said anchor means is an adhesive strip; and (d) wherein said object fastening means includes a pair of holes to receive said means for securing said object thereto; and (e) wherein said means for securing said object is a fastener; and (f) wherein said fastener comprises a twister, plastic tie, metal wire, rope, or string; and (g) wherein said means for releasably securing said object fastening means comprises VELCRO.

2. A device for releasably fastening an object to a supporting structure comprising:

a) anchor means for anchoring said device to said support structure, said anchor means including means for releasably securing an object fastening means;

b) said object fastening means including means for securing a disk means, and means for releasably securing said object fastening means to said anchor means; and c) said disk means including means for securing said object thereto, and means for securing said disk means to said object fastening means (d) wherein said anchor means is an adhesive strip; and (e) wherein said disk means includes a pair of holes to receive said means for securing said object thereto; and (f) wherein said means for securing said object is a fastener; and (g) wherein said fastener comprises a twister, plastic tie, hooks, metal wire, rope or string; and (h) wherein said means for releasably securing said fastening means comprises VELCRO.

3. A method for releasably fastening an object to a supporting structure which comprises the following steps:

a) attaching an anchor means to said supporting structure, said anchor means including means for releasably securing said anchor means to an object fastening means; and b) fastening said object to said object fastening means with a fastener, said object fastening means including means for releasably securing said object fastening means to said anchor means; and c) releasably securing said object fastening means to said anchor means (d) wherein said anchor means is an adhesive strip; and (e) wherein said object fastening means includes a pair of holes to receive said fastener; and (f) wherein said fastener comprises a twister, plastic tie, hooks, metal wire, rope or string; and (g) wherein said means for releasably securing said fastening means comprises VELCRO.

4. A method according to claim 3, wherein said object to be fastened is Christmas light wiring.

* * * * *